(12) United States Patent
Hager et al.

(10) Patent No.: US 7,284,338 B2
(45) Date of Patent: Oct. 23, 2007

(54) POSITION MEASURING SYSTEM

(75) Inventors: Andreas Hager, Kirchweidach (DE); Karl Fiedler, Siegsdorf (DE); Johann Tauber, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 51 days.

(21) Appl. No.: 10/565,708

(22) PCT Filed: Apr. 6, 2005

(86) PCT No.: PCT/EP2005/003586

§ 371 (c)(1),
(2), (4) Date: Jan. 24, 2006

(87) PCT Pub. No.: WO2005/116461

PCT Pub. Date: Dec. 8, 2005

(65) Prior Publication Data

US 2007/0079519 A1    Apr. 12, 2007

(30) Foreign Application Priority Data

May 18, 2004 (DE) ............... 10 2004 025 192
Mar. 23, 2005 (DE) ............... 10 2005 013 364

(51) Int. Cl.
*G01D 5/347* (2006.01)

(52) U.S. Cl. ............... 33/706; 33/707; 33/708; 33/1 PT

(58) Field of Classification Search ......... 33/706–708, 33/1 PT; 411/176, 190, 427, 432, 378
See application file for complete search history.

(56) References Cited

U.S. PATENT DOCUMENTS

| 3,053,357 | A | | 9/1962 | Stanger |
| 5,137,406 | A | | 8/1992 | Cosenza |
| 6,002,126 | A | * | 12/1999 | Feichtinger ............ 33/707 |
| 6,415,524 | B1 | | 7/2002 | Müller et al. |
| 7,143,523 | B2 | * | 12/2006 | Mauermann ............ 33/706 |
| 2006/0277771 | A1 | * | 12/2006 | Mitterreiter ............ 33/1 N |

FOREIGN PATENT DOCUMENTS

EP    0 526 681 A1    2/1993
GB    780237    7/1957

* cited by examiner

*Primary Examiner*—Yaritza Guadalupe-McCall
(74) *Attorney, Agent, or Firm*—Brinks Hofer Gilson & Lione

(57) ABSTRACT

A position measuring system for determining the position of a first structural component and a second structural component. The position measuring system includes a first support for receiving a first position measuring device, which is set up and provided for being fastened to the first structural component and a second support for receiving a second position measuring device, which is set up and provided for being fastened to the second structural component. The position measuring system further includes a first connector that fastens the first support to the first structural component and a second connector that fastens the second support to the second structural component, wherein the second connector includes a nut, with which a screw can be brought into engagement, wherein the nut is inserted into a recess of the second support. The position measuring system further includes a blocking element which, in an inserted state, works together with the nut in order to prevent a movement of the nut out of the recess in an axial direction, which is the direction of insertion of said screw into said nut, sufficiently far so that insertion of the screw into the nut is made possible.

37 Claims, 9 Drawing Sheets

POSITION MEASURING SYSTEM

BACKGROUND OF THE INVENTION

The present invention relates to a position measuring system for determining the position of two structural components which are movable in relation to each other.

FIELD OF THE INVENTION

Such a position measuring system includes a first support for receiving a position measuring device, such as a scale graduation, of the position measuring system, which is set up and provided for being fastened to one of the two structural components, as well as a second support for receiving a position measuring device, such as a scanning unit, of the position measuring system, which is set up and provided for being fastened to the other one of the two structural components which are movable with respect to each other, and furthermore connectors for fastening the two supports on the respectively assigned structural component. At least one of the connectors includes a nut and an associated screw, wherein the latter can be inserted into a recess of the support assigned to the connector.

Advantageously the recess is embodied to extend in the longitudinal direction in such a way that the nut can be shifted in the recess perpendicularly to the axial direction of the associated screw for the purpose of compensating tolerances.

DESCRIPTION OF THE RELATED ART

In particular, the position measuring system can be a so-called linear measuring system which has a linear scale and the scanning unit has a scanning head (arranged on a scanning carriage), which scans the scale. In this case the first support of the position measuring system is a longitudinally extending housing as a rule, in which the linear scale is fixedly housed and the scanning carriage can be longitudinally displaced, and the second support is a mounting base, which is connected with the scanning carriage, i.e. can be displaced together with it in the extension direction. Because the housing on the one hand and mounting base on the other hand are respectively connected with one of two structural components of a machine, in particular a machine tool, which can be shifted with respect to each other, it is possible by the linear measuring system to detect a relative movement of the two structural components with respect to each other, which corresponds to a relative movement of the mounting base with respect to the housing, and therefore of the scanning head with respect to the linear scale, and its amount can be precisely determined.

In the course of installing such a position measuring system (in particular linear measuring system) in a machine tool, i.e. the fastening of the two supports (for example a longitudinally extending housing on the one hand and a mounting base on the other) to the structural components of the machine tool (for example a machine bed and a tool receiver) which can be moved with respect to each other, there often is too little space available between the individual machine elements for performing the assembly work. Thus, when making a nut-screw connection it is often not possible to grasp the nut with a tool and to secure it against slipping or falling out of the associated recess until the associated screw has been screwed into the interior thread of the nut. Often there is not sufficient space available for grasping the nut with the fingers.

SUMMARY AND OBJECTS OF THE INVENTION

Therefore an object of the present invention is based on providing a position measuring system of the type mentioned at the outset, with which the installation in a machine to be equipped with the measuring system is made easier.

This object is attained in accordance with the present invention by the creation of a position measuring system for determining the position of a first structural component and a second structural component. The position measuring system includes a first support for receiving a first position measuring device, which is set up and provided for being fastened to the first structural component and a second support for receiving a second position measuring device, which is set up and provided for being fastened to the second structural component. The position measuring system further includes a first connector that fastens the first support to the first structural component and a second connector that fastens the second support to the second structural component, wherein the second connector includes a nut, with which a screw can be brought into engagement, wherein the nut is inserted into a recess of the second support. The position measuring system further includes a blocking element which, in an inserted state, works together with the nut in order to prevent a movement of the nut out of the recess in an axial direction, which is a direction of insertion of the screw into the nut, sufficiently far so that insertion of the screw into the nut is made possible.

The attainment of the object of the present invention mentioned previously makes a blocking element available in a cost-effective manner, which secures the nut inserted into the associated recess against falling out in the axial direction (with respect to the direction of extension of the screw to be turned into the nut or substantially perpendicular to the opening of the nut).

For example, the blocking element is a clip. In this connection a clip is understood to be an insertion element which can be pushed on or into the recess in which the nut is received and in the process makes a connection, so that the clip, or insertion element, is fixed in place on the recess and covers it for the axial securing of the nut. The clip therefore is (any arbitrary) insertion element, which can be arranged on the recess which receives the nut in such a way that, one the one hand, it covers the nut and, on the other, is fixed in place on the recess.

The ability of the nut to be shifted in the recess perpendicularly with respect to the axial direction of the associated screw for the purpose of a tolerance compensation is preferably achieved in that the nut is seated in the recess with a certain axial play (which can be as small as desired). A seating with axial play is here generally understood to be any seating of the nut in the recess which, because of the substantially loose arrangement of the nut in the recess, permits a shifting of the nut perpendicularly with respect to the axial direction, even if no substantial movement should be possible in the axial direction (because of an extremely limited axial play). Accordingly it is advantageous that the nut is not clamped (by axially acting forces) in the recess (between the bottom of the recess and the clip) in such a way that it can no longer be moved along the direction of extension of the recess.

In connection with an arrangement of the nut in the recess between the bottom surface of the recess and a contact face of the blocking element, axial play is achieved in that the distance between the bottom surface of the recess and the contact face of the blocking element, against which the nut can be supported in the axial direction, is greater than or equal to the thickness of the nut along this direction.

In accordance with a preferred embodiment of the present invention a clip is arranged substantially within the recess and in particular is fixed on it inside of the recess. In this connection the fixation in place of the clip advantageously takes place against an encircling interior wall of the recess, which projects away from the bottom surface of the recess and defines the opening to be covered or closed by the clip on the side facing away from the bottom surface. The interior wall of the recess does not absolutely have to be completely encircling, instead it can also have one or several interruptions in the circumferential direction. It is of importance that the interior wall of the recess encloses the outer edge of the clip at least partially.

The fixation in place of the clip on the interior wall of the recess can be advantageously achieved in that a sharp-edged outer rim of the clip is pushed (under prestress) against the interior wall of the recess in such a way that it is secure against slipping out in the axial direction. The clip is designed to be elastically deformable in at least one portion for providing a sufficient prestress.

In accordance with an embodiment of the present invention, the clip has at least two sections which are angled off the contact face for the nut, which preferably extend parallel to respective sections of the (encircling) interior wall of the recess, wherein at least one tongue has been formed out of the respective angled-off section of the clip and acts with an edge on the interior wall of the recess. In this case the action of the sharp edges of the tongues on the interior wall of the recess takes place opposite the direction along which the clip can be moved out of the recess, so that the clip is fixed in place against the interior wall in the axial direction.

In accordance with another embodiment of the present invention, the base body of the clip which includes the contact face for the nut and extends perpendicularly with respect to the encircling interior wall of the recess can be elastically deformed in such a way that it rests with at least one edge, preferably several edges of its (encircling) outer rim against the interior wall of the recess under prestress.

To this end the base body of the clip can, on the one hand, be designed to be bendable in such a way that it arches when inserted into the recess and then rests in the arched state with at least one sharp edge under prestress against the interior wall of the recess. It is alternatively possible to provide weakened areas, in particular in the form of penetrating holes, in the base body, so that in the course of being inserted into the recess, the base body is deformable in its plane of extension, i.e. substantially perpendicularly with respect to the encircling inner wall of the recess, and then rests under an outward-acting prestress with at least one edge against the interior wall of the recess.

In accordance with a further embodiment of the present invention, the clip is fixed in a positively connected manner, in particular in the form of a snap-in connection, with the interior wall of the recess. It is possible to this end to provide (form) snap-in hooks, for example, on the clip, which engage corresponding undercuts in the interior wall of the recess. On the other hand it is possible to provide (form) one or several protrusions on the clip, which engage associated holes in the interior wall of the recess.

In accordance with an advantageous further development of the present invention the clip has an elongated hole in its base body being used as the contact face for the nut, which can be engaged by the screw associated with the nut with its free end projecting from the nut. By this it is achieved that the screw can be shifted together with the nut perpendicularly with respect to the axial direction for compensating manufacturing or assembly tolerances.

To make the turning of the screw into the associated nut easier, a twisting guard is preferably provided, which prevents a rotating movement of the screw in the recess. For one, this twisting guard can be integrated into the recess itself, in particular in that the (for example polygonal) inner contour (encircling interior wall) of the recess is matched to the outer contour of the nut in such a way that it does not permit a rotating movement of the nut in the recess.

Alternatively it is also possible to integrate a corresponding twisting guard into the clip in that it extends around the nut in a positively connected manner, for example by legs provided on the clip. In this case it is necessary in turn to fix the clip secure against twisting (positively connected) in the recess.

Further details and advantages of the present invention will become apparent in the course of the following description of exemplary embodiments by the drawing figures.

Shown are in:

BRIEF DESCRIPTION OF THE DRAWINGS

FIG. 2b is a rear plan view of the recess in FIG. 2a;

FIG. 3b, a perspective view from above on the clip in accordance with FIG. 3a following the insertion into a recess in accordance with FIG. 2a;

FIG. 3c is a partially broken-open perspective representation of the arrangement in FIG. 3a;

FIG. 4c is a perspective view from above on the clip from FIG. 4a following the insertion into a recess in accordance with FIG. 2a;

FIG. 6b is a partially broken-open perspective representation of the clip in FIG. 6a in the recess in FIG. 2a;

FIG. 7b is a partially broken-open perspective representation of the clip in FIG. 7a following its placement into the recess in accordance with FIG. 2a;

DESCRIPTION OF THE PREFERRED EMBODIMENT(S) OF THE INVENTION

Figure 1:
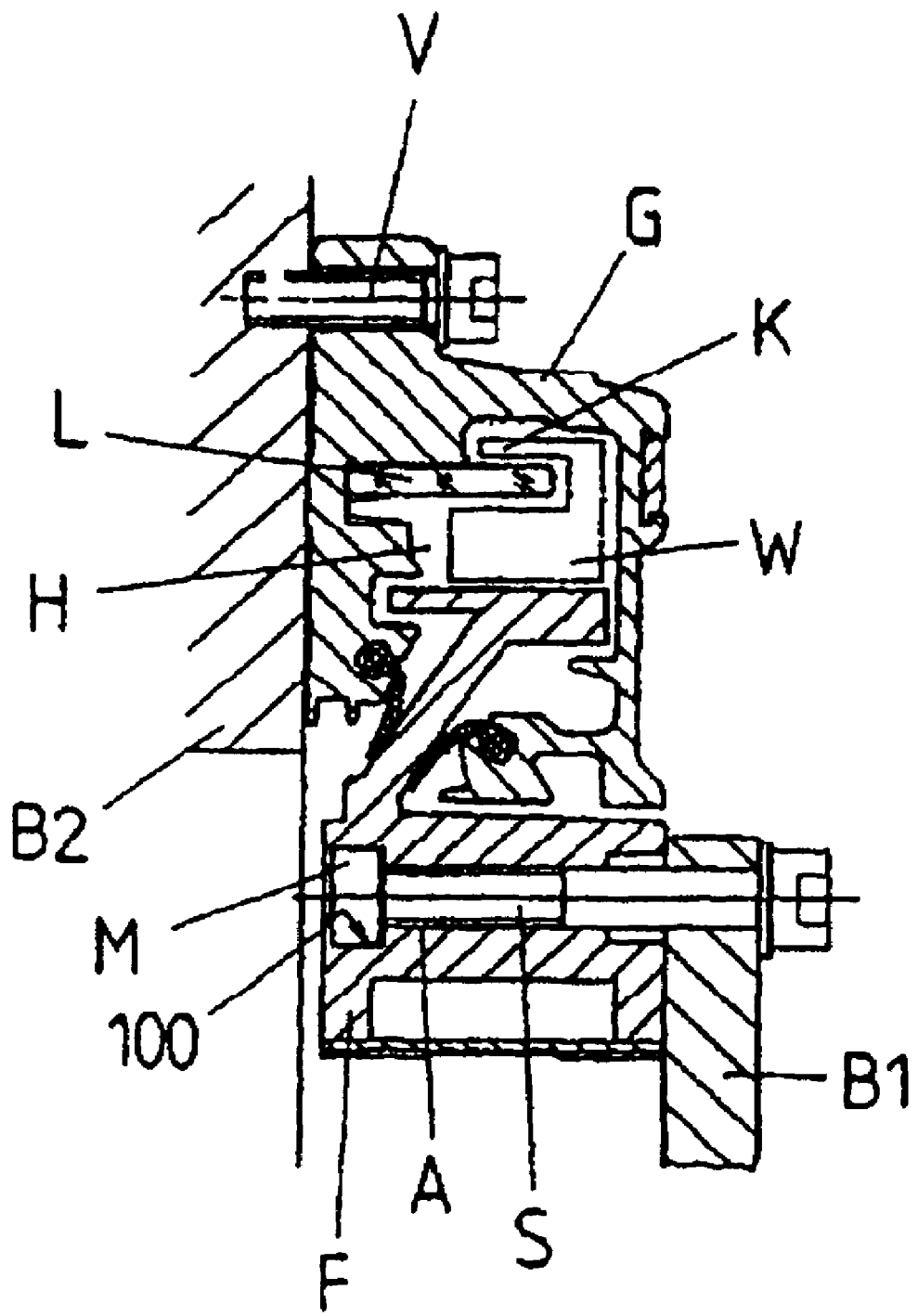
FIG. 1 is a schematic cross-sectional view of an embodiment of a position measuring system in the form of a linear measuring system in accordance with the present invention.

FIG. 1 shows a cross section through a position measuring system in the form of a linear measuring system, which is used for determining the relative position of two structural components B1, B2 of a machine tool, for example the machine bed and a structural tool group, which are movable in a linear direction with respect to each other.

The linear measuring system includes a position measuring device such as a linear scale L arranged in a hollow space H of a housing G extending in the longitudinal direction E of the scale L, as well as a second position measuring device such as a scanning unit that includes a scanning head K arranged on a scanning carnage W for scanning a measuring graduation applied to the scale L. The measuring graduation is arranged to be displaceable in relation to the linear scale L in the direction E of its extension in the hollow space H of the housing G and is connected with a mounting base F. The mounting base F on the one hand and the housing G on the other are respectively connected by suitable connectors M, S or V with the assigned structural component B1 or B2 of the machine tool.

The connectors provided at the mounting base F and used for connecting it with a structural component B1 of the machine tool include a screw S extending respectively through an opening in the mounting base F on the one hand and the corresponding structural components B1 of the machine tool on the other hand, as well as a nut M, whose interior thread is engaged by the exterior thread of the screw S and which is seated in a recess 100 of the mounting base F.

Figure 2B:
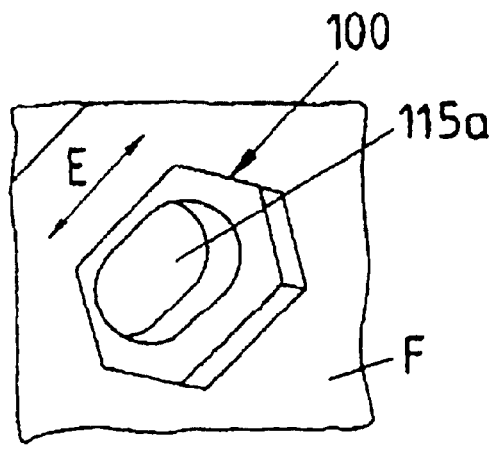
Figure 2A:
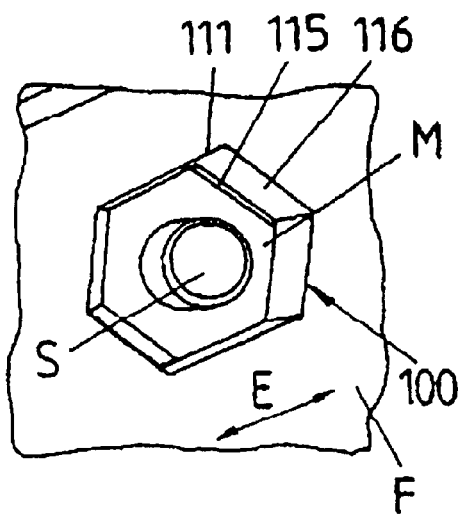
FIG. 2a is a perspective detail representation of the position measuring system in FIG. 1 with an embodiment of a recess, in which an embodiment of a nut used for fastening the position measuring system to a machine part is received in accordance with the present invention.

The recess 100 used for receiving the nut M is represented enlarged in FIGS. 2a and 2b in a perspective front view, as well as in a perspective rear view, and in FIG. 2a together with the nut M arranged therein, as well as the associated screw S.

It can be seen that the inner contour 111 of the recess 100 is polygonal in cross section, namely hexagonal, and forms an encircling interior wall 116 which terminates in a bottom surface 115 of the recess 100. On its side facing away from the bottom surface 115, the recess 100 forms an opening, through which the nut M can be inserted into the recess 100.

The polygonal inner contour 111 of the recess 100 is matched to the also polygonal (hexagonal) outer contour of the nut M in such a way that the latter can twist only to a limited degree in the recess 100, so that in the course of turning the associated screw S into the inner thread of the nut M, the nut M can be held substantially fixed against relative rotation in the recess 100 of the mounting base F.

In the direction E of extension of the measuring system, i.e. in particular the linear scale L and the housing G, see FIG. 1, the recess 100 has a greater or the same extension as the nut M, so that for compensating tolerances during mounting, the nut M can still be displaced in this direction E. Because the recess 100 has an elongated hole 115a in its bottom surface 115 in accordance with FIG. 2b extending in that direction E, through which the screw S shown in FIG. 2a passes, the screw S can be displaced, together with the nut M, in the direction E of extension of the position measuring system for tolerance compensation, see FIG. 1.

In spite of securing the nut M against twisting inside the recess 100, which makes the insertion of the screw S into the interior thread of the nut M easier, there is the problem that the nut M can fall out of the recess 100 in the axial direction −R (relating to the linear extension of the threaded section of the screw S provided with the outer thread A), if it is not secured against sliding axially out of the recess 100 through the opening located opposite the bottom surface 115.

Figure 3A:
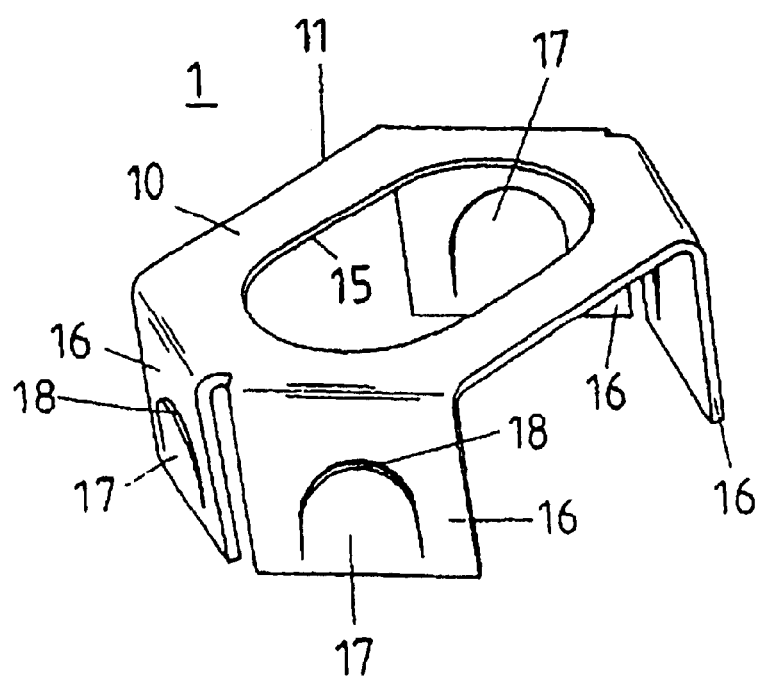
FIG. 3a is a perspective representation of a first exemplary embodiment of a blocking element in the form of a clip for securing the nut in the recess in accordance with FIG. 2a in accordance with the present invention.

FIG. 3a shows a first exemplary embodiment of a blocking element in the form of a clip 1, which can be pushed into the recess 100 of the mounting base F, and by which the nut M can be secured against axially falling out of the recess 100 of the mounting base F, wherein the movement of the nut M perpendicularly with respect to the axial direction (the direction of insertion of the screw S into the nut M), i.e. along the direction E of extension of the position measuring system, is simultaneously not hampered.

Figure 3B:
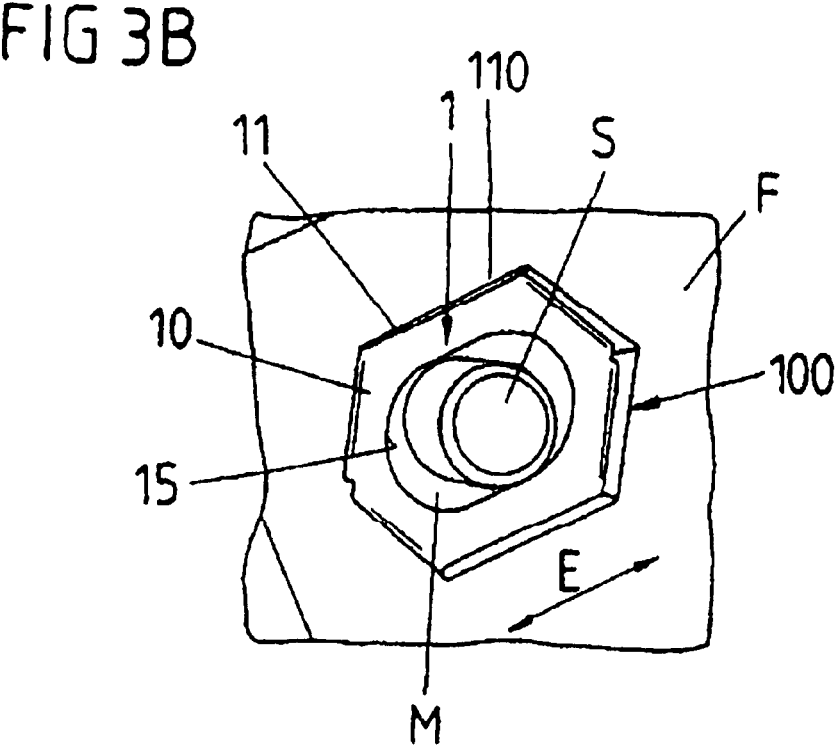
Figure 3C:
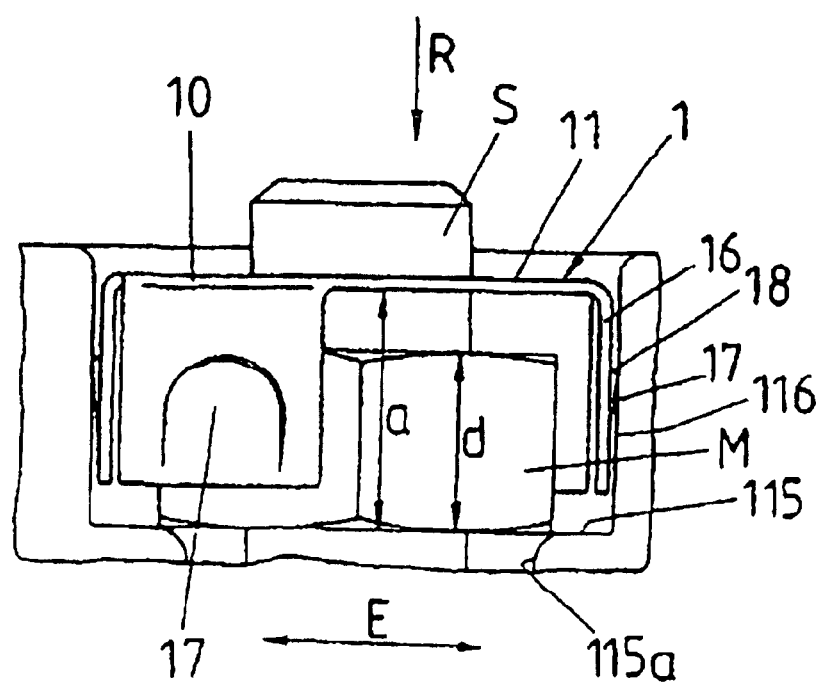

The clip 1, which preferably can be designed as a stamped part made of a spring plate, has a base body 10 having an outer contour 11 matched to the inner contour 111 of the recess 100 and is provided with an elongated hole 15 which, following the insertion of the clip 1 into the recess 100 extends along the direction E of extension of the position measuring system, see FIGS. 3b and 3c.

Four sections 16 in the form of resilient legs are angled off the base body 10 of the clip 1 and, in the inserted state of the clip 1, substantially extend along each one of the opposite sections of the interior wall 116 of the recess 100. A tongue 17 has been formed by cutting on each leg 16 and protrudes under prestress slightly outwardly away from the respective leg 16 (in the inserted state in the direction toward the interior wall 116 of the recess 100, see FIG. 3c), and has been designed with a sharp edge (with a sharp-edged section 18) on its upper end respectively resting against the associated section of the interior wall 116.

When inserting the clip 1 into the recess 100 along the insertion direction R indicated in FIG. 3c, the outwardly protruding tongues 17 of the angled-off legs 16 slide along the respectively associated section of the interior wall 116 of the recess 100, wherein the legs 16 and the tongues 17 resiliently give inward. In this way the clip 1 can be brought into the recess with little expenditure of energy (pushed in/pressed in).

After arranging the clip 1 in the recess 100, as represented in FIGS. 3b and 3c, the sharp-edged sections 18 of the tongues 17 are pressed under prestress against the respectively oppositely located section of the interior wall 116 of the recess 100 and dig into the respective section of the interior wall 116 when an axial force opposite the joining direction R is exerted on the clip 1, possibly because the nut M pushes against the base body 10 of the clip 1 during assembly. The clip 1 is securely maintained in the axial direction in the recess 100 because of this effect of the sharp-edged sections 18 of the tongues 17 on the interior wall 116 of the recess 100. This means that at the same time the nut M can also not slip out of the recess 100 in the axial direction, since the base body 10 of the clip 1 acts as an axial contact face, which limits the movement of the nut M in the axial direction and thus maintains it in the recess 100.

By FIG. 3c it can be seen that the thickness d of the nut M is less than the distance a of the base body 10 of the clip 1, which is used as the contact face, from the bottom surface 115 of the recess 100. Because of this the nut M is seated with axial play in the recess 100, at least prior to the screw S being tightened, so that it can be shifted for the purpose of tolerance compensation along the direction E of extension of the position measuring system (i.e. perpendicularly with respect to the axial extension of the screw S). Such a shifting movement can easily be followed by the screw S, since it passes through an elongated hole 115a extending in the bottom surface 115 of the recess 100 in the direction E of extension.

The clip 1 represented by FIGS. 3a to 3c has the advantage that it can be inserted as a self-maintained insertion element into common recesses 100 of a mounting base F without it being necessary to specially design the wall of the recess 100, formed by the bottom surface 115 and the interior wall 116, for fixing the clip 1 in place. Instead, the fixation in place of the clip 1 in the recess 100 is solely achieved by the design of the clip 1 with sharp-edged sections 118, which can dig into the encircling interior wall 116 of the recess 100. Based on the spring-elastic embodiment of the angled-off legs 116 and the tongues 117, it is possible here to compensate greater tolerances with respect to the exterior dimensions of the clip 1, on the one hand and, on the other, the interior dimensions of the recess 100. Moreover, the mobility of the nut M for purposes of tolerance compensation is practically not affected in comparison with an arrangement without a clip.

Figure 4A:
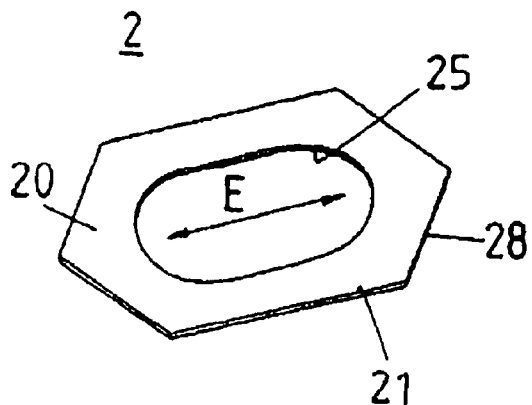
FIG. 4a shows a second exemplary embodiment of a clip which can be employed for the axial securing of a nut in the recess in accordance with FIG. 2a in accordance with the present invention.
Figure 4B:
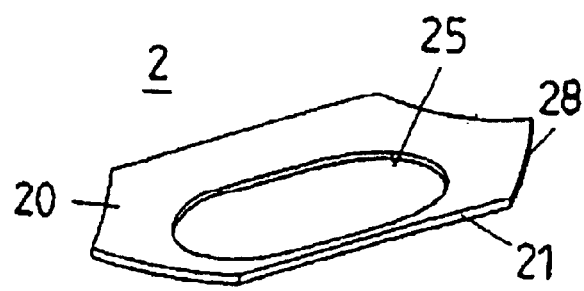
FIG. 4b shows the clip in FIG. 4a in the arched state.

FIG. 4a shows a second exemplary embodiment of a clip 2, which is preferably made of a spring plate and includes a base body 20 with a polygonal (hexagonal) outer contour 21, which is provided on the one hand with an elongated hole 25, and on the other hand with sharp-edged sections 28 along the outer contour 21. Because of its elastic design, the clip 2 can be easily arched by bending it with an appropriate force, see FIG. 4b.

Figure 4C:
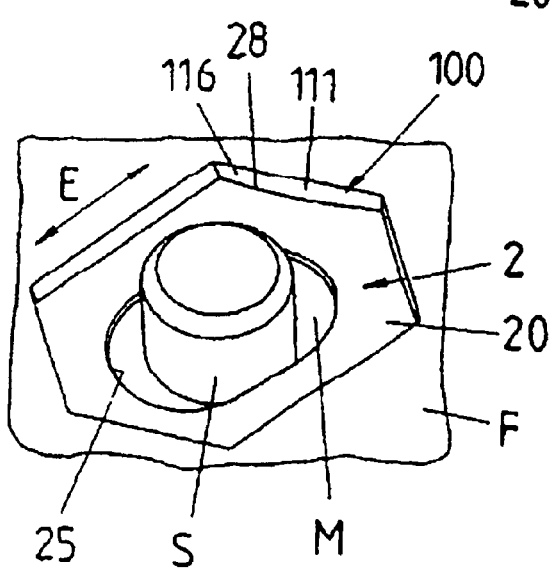
Figure 4D:
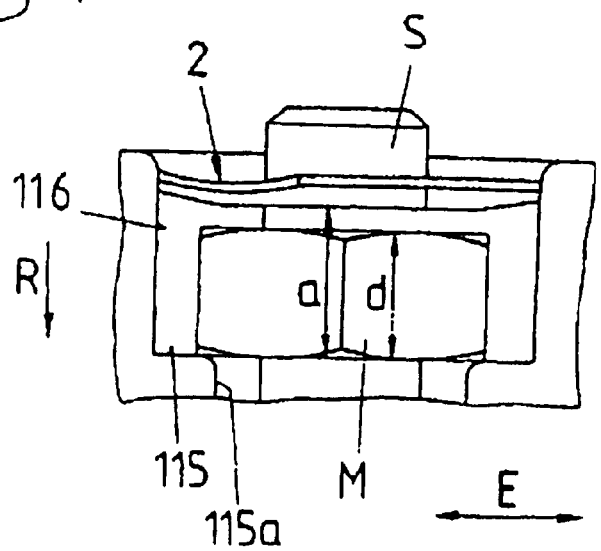
FIG. 4d is a partially broken-open perspective representation of the arrangement in FIG. 4c.

The clip 2 is designed in such a way that it has a slightly greater extension in one direction, preferably along the direction E of extension of the position measuring system, than the recess 100, see FIGS. 4c and 4d. Because of this, forces at the edges act on the outer contour 21 of the base body 20 when fitting (pressing in) the clip 2 into the recess 100 of the mounting base F, which act counter to the insertion of the clip into the recess. Because of forces simultaneously acting in the joining direction R on the clip 2 in the course of pressing in/inserting the clip 2, its base body 20 arches because of being bent, as represented in FIGS. 4c and 4d, wherein the effective length of the base body 20 of the clip 2 is slightly reduced in the direction E of extension, so that the clip 2 can be pushed further into the recess 100. As a result, in the arched state the sharp-edged sections 28 of the outer contour of the clip 2 then rest against the interior wall 116 of the recess 100, so that they are axially fixed in place in the recess 100.

As in the previous exemplary embodiment, here, too, the distance a between the base body 20 of the clip 2 and the bottom surface 115 of the recess 100 is greater than the thickness d of the nut M, so that the nut M is seated with sufficient axial play between the bottom surface 115 of the recess 100 and the base body 2 of the clip 2 in order to permit a tolerance compensation in a direction E perpendicular to the axial line.

In comparison with the clip shown in FIGS. 3a to 3c, the clip 2 described by FIGS. 4a to 4d is in particular distinguished by its simple design. But it must be more accurately matched to the inner contour 111 of the recess 100 with respect to its exterior dimensions, i.e. the design of the outer contour 21, because the possibilities for compensating larger tolerances in the mentioned dimensions ensuing from the use of angled resilient legs no longer apply.

Figure 5A:
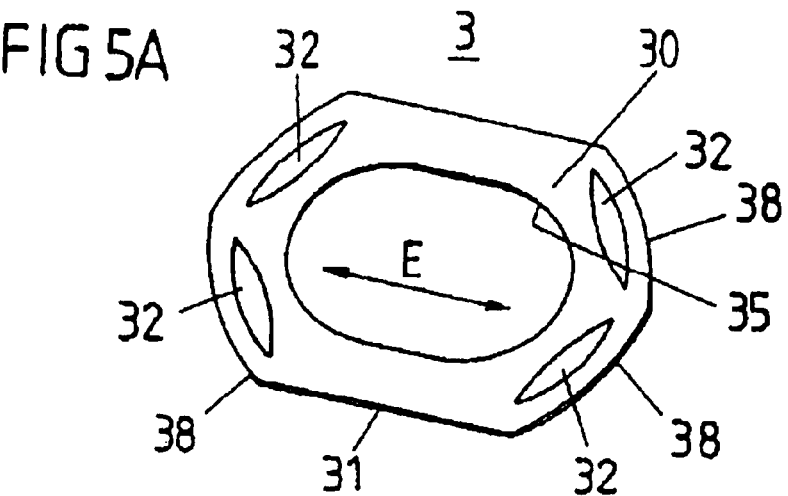
FIG. 5a shows a third exemplary embodiment of a clip which can be employed for the axial securing of a nut in the recess in accordance with FIG. 2a in accordance with the present invention.
Figure 5B:
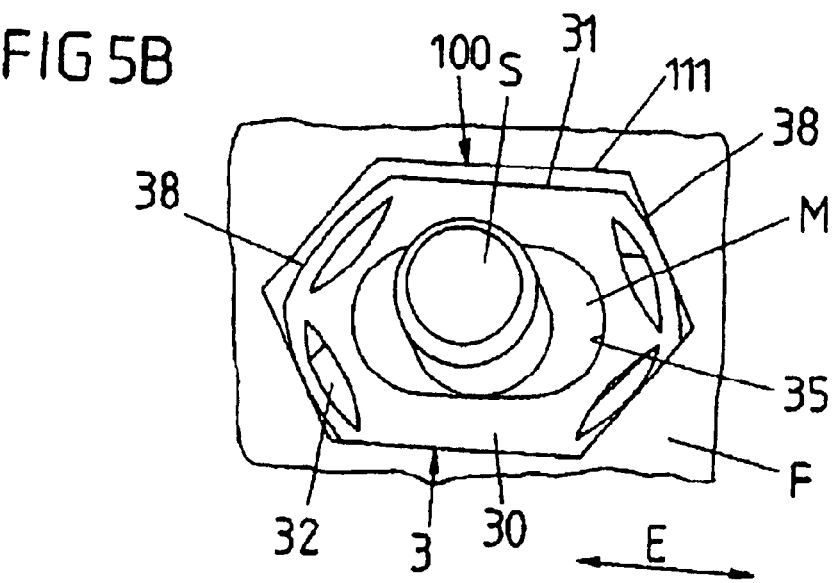
FIG. 5b is a perspective view from above on the clip from FIG. 2a with the clip in accordance with FIG. 5a placed on it.
Figure 5C:
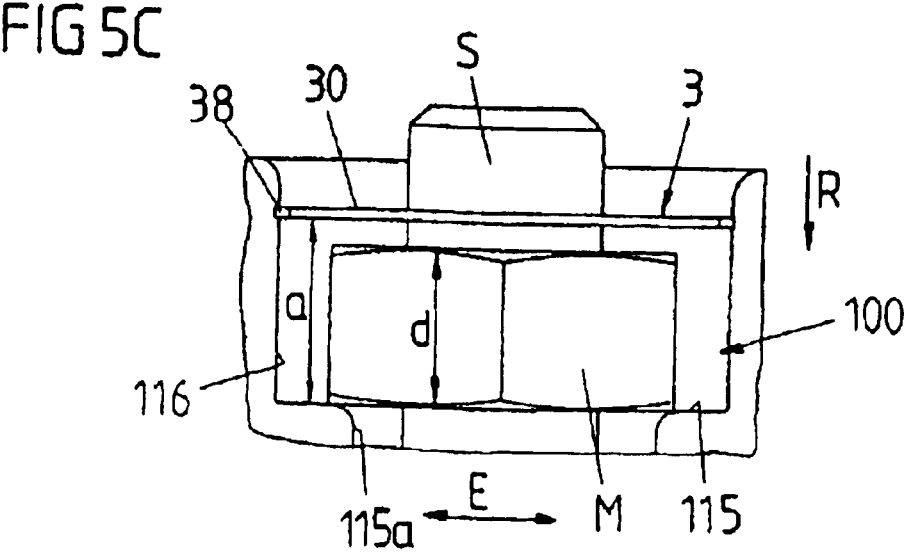
FIG. 5c is a partially broken-open perspective representation of the arrangement in FIG. 5b.

A further clip 3 made of a spring plate is represented in FIGS. 5a to 5c, whose base body 30 substantially extends in a plane, the same as the clip 2 shown in FIGS. 4a to 4d, and which has a slightly greater extension in one direction, in particular the direction E of extension of the position measuring system, than the recess 100 of the mounting base F.

In addition to the elongated hole 35 through which the screw S is to be passed, the clip 3 has four weakened areas 32 in the form of elongated passages in its base body 30, which respectively extend along a sharp-edged section 38 of the outer contour 31 of the base body 30. This makes a deformation of the base body 30 in its plane of extension possible when it is being pushed into the recess 100, wherein the sharp-edged sections 38 are slightly pushed inward into the weakened areas 32, so that the clip 3 can be pushed into the recess 100 because of the elastic deformation of its base body 30. Following the insertion of the clip 3 into the recess 100, its sharp-edged sections 38 push outward against the interior wall 116 of the recess 100, so that the clip 3 is fixed in place in the recess 100.

Otherwise the exemplary embodiment represented by FIGS. 5a to 5c agrees, in particular in regard to the function of the clip 3, with those already represented by FIGS. 3a to 3c and 4a to 4d, so that for further details reference is made to the respective explanations.

Regarding its particular advantages, the clip represented in FIGS. 5a to 5c corresponds to the one shown in FIGS. 4a to 4d, since this is also a flat sheet metal element which can be produced simply and cost-effectively, for which attention must be paid to the matching of the outer contour 31 of the clip 3 to the inner contour 111 of the recess 100.

Figure 6A:
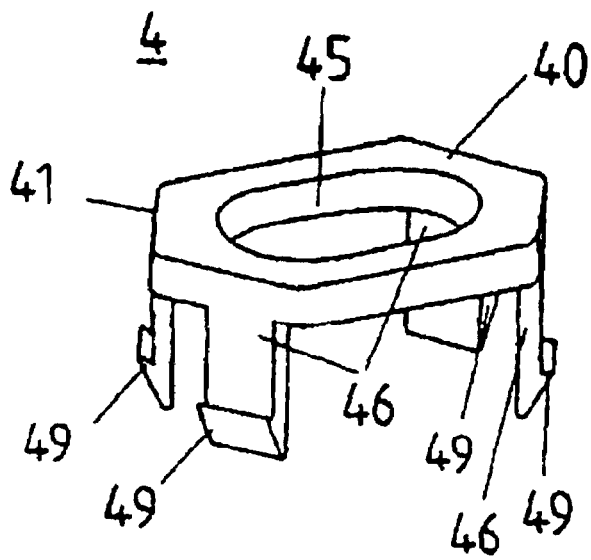
FIG. 6a shows a fourth exemplary embodiment of a clip which can be employed for the axial securing of a nut in the recess in accordance with FIG. 2a in accordance with the present invention.
Figure 6B:
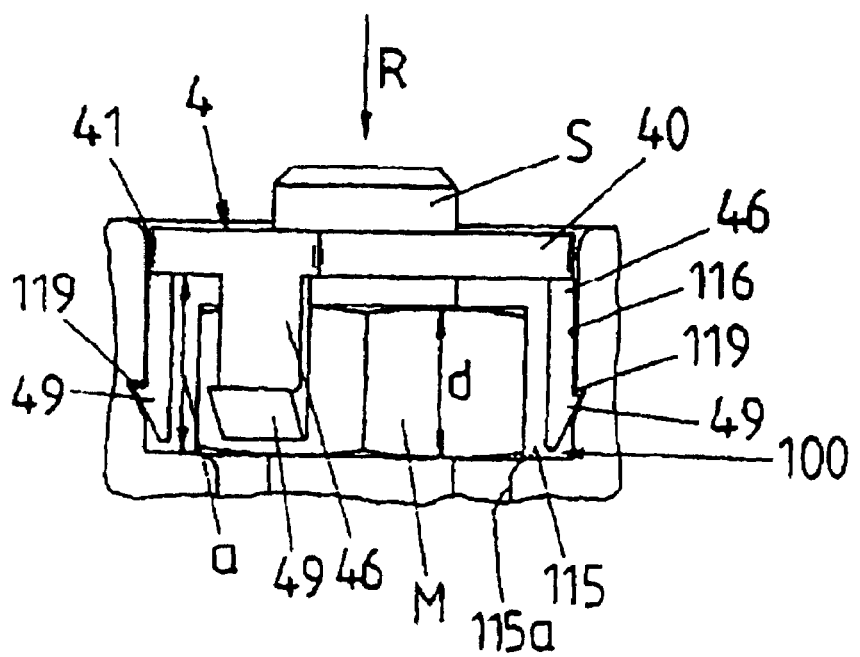

An exemplary embodiment of a clip 4 is represented in FIGS. 6a and 6b, which has a base body 40 surrounded by a polygonal (hexagonal) contour 41 and an elongated hole 45 and from which protrude (substantially perpendicularly) four snap-in hooks 46 provided with snap-in protrusions 49. Corresponding undercuts 119 in the encircling interior wall 116 of the recess 100 of the mounting base are assigned to the snap-in protrusions 49 of the snap-in hooks 46, so that the clip 4 can be fixed in place by means of a snap-in connection against the wall 115, 116 of the recess 100, in particular against the interior wall 116. The insertion of the clip 4 into the recess 100 is made possible by a spring-elastic design of the snap-in hooks 46, which can be bent away toward the interior when the clip 4 is inserted into the recess 100 and then snap with their snap-in sections 49 into the undercuts 119 of the interior wall 116.

The clip shown in FIGS. 6a and 6b can also be advantageously designed as a plastic part, because no sharp-edged sections of the outer contour 41 are needed for providing the snap-in connection with the interior wall 116 of the recess 100, since this is provided by the snap-in protrusions 49 snapping into the associated undercuts 119. The clip 4 can therefore be produced in a cost-efficient manner by injection molding (as injection-molded element), wherein simultaneously larger tolerances regarding the outer dimensions of the clip 4 on the one hand and, on the other, the inner dimensions of the recess 100, can be compensated by the spring-elastic design of the snap-in hooks 46.

However, use of a clip 4 provided with snap-in hooks 46 requires the formation of snap-in openings, in particular in the form of undercuts 119 in the recess 100 of the mounting base. This is possible in a particularly easy way if the mounting base is made by milling, in the course of which appropriate snap-in opening can be easily created.

The space requirement for the snap-in hooks 46 can lead to a certain reduction of the extent of the tolerance compensation, which is possible by shifting the nut M in the direction E of extension of the position measuring system, while the tolerance compensation is not affected at all by the level clips 2, 3 shown in FIGS. 4a to 4d and 5a to 5c.

The latter also applies to the clip 5 represented in FIGS. 7a and 7b, which again can be an injection-molded element made cost-effectively of plastic. This includes a flat base body 50 delimited by a polygonal (hexagonal) outer contour 51 with an elongated hole 55, from which two pins 53 provided with ribs 54 extend perpendicularly. Corresponding holes 113 in the form of bores in the vicinity of the recess 100 are associated with the pins 53, into which the pins 53 can be inserted and wherein the ribs 54 press against the outer walls of the bores 113 and in this way provide a dependable fixation of the clip 5 by the engagement of the pins 53 with the associated bores 113.

Figure 7A:
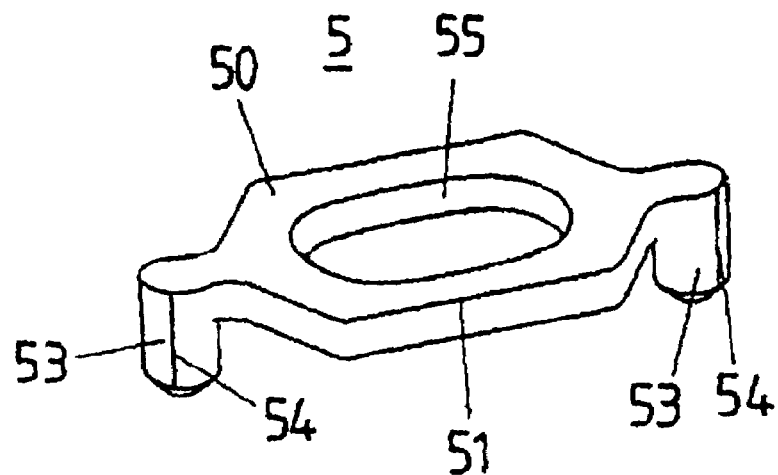
FIG. 7a shows a fifth exemplary embodiment of a clip which can be employed for the axial securing of a nut in the recess in accordance with FIG. 2a in accordance with the present invention.
Figure 7B:
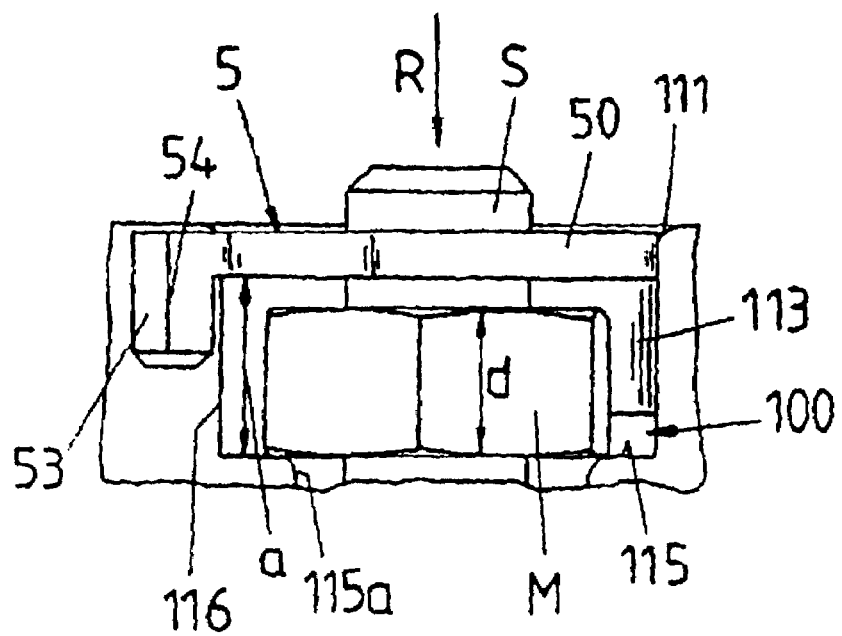

In comparison with the clip 4 represented by FIGS. 6a and 6b, which can also be produced as an injection-molded part, the clip 5 represented in FIGS. 7a and 7b, which can be fixed in place on the recess 100 by a plug connection, is primarily distinguished in that the amount of a tolerance compensation is not diminished by a displacement of the nut M in the recess 100 in a direction E of extension of the position measuring system. However, here additional working of the material in the vicinity of the recess 100 is required for creating suitable holes 113 for receiving the pins 53.

Otherwise the clips 4, 5 described by FIGS. 6a and 6b, as well as FIGS. 7A and 7b, match the clips 1, 2, 3 explained by FIGS. 3a to 3c, 4a to 4d and 5a to 5c, in particular with respect to their functioning, so that reference is made to the respective descriptions for further details.

Figure 8:
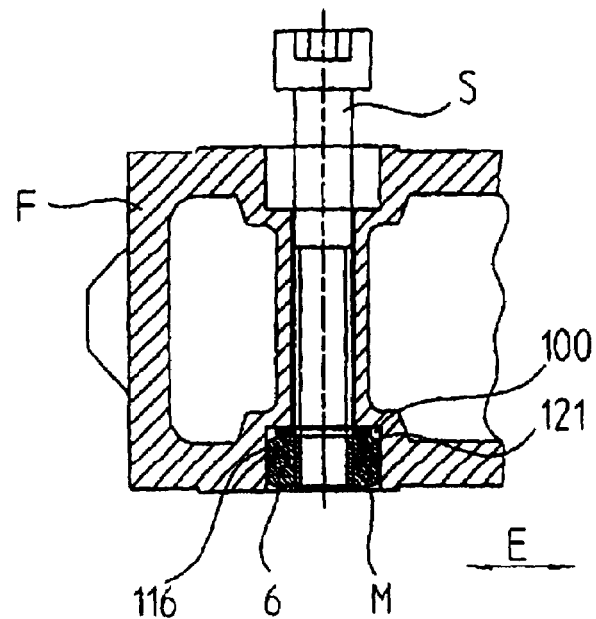
FIG. 8 shows an exemplary embodiment wherein an embodiment of a blocking element is an O-ring inserted into an embodiment of a nut.
Figure 9:
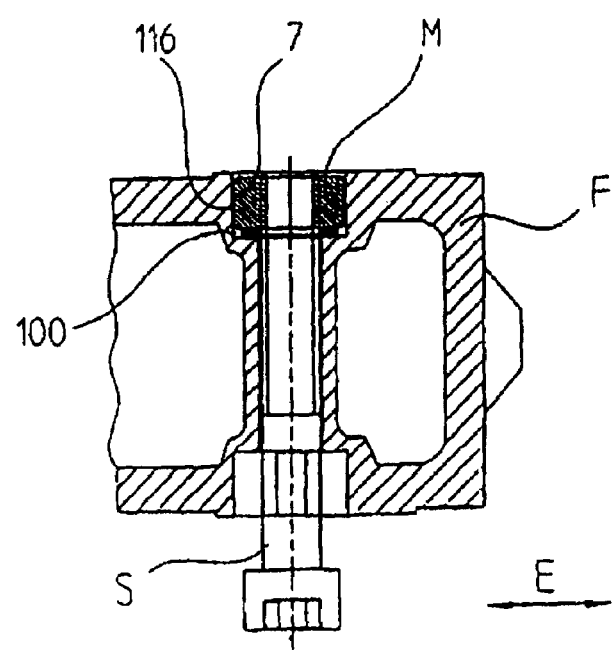
FIG. 9 shows an exemplary embodiment wherein an embodiment of a blocking element is an elastic coating on an embodiment of a nut.

FIGS. 8 and 9 show two embodiments in which the nut M is secured against axially falling out of the recess 100 by clamping it circumferentially in the recess 100. In this case it is particularly advantageous that the blocking element 6, 7 is arranged between the nut M and the interior wall 116 of the recess 100 and is an elastically yielding element made of a resiliently yielding material, for example plastic.

In FIG. 8 a groove 121 has been cut over the circumference of the nut M. In accordance with FIG. 9, the blocking element is an elastically yielding element, such as coating 7 applied to the outer circumference of the nut M. This coating can be provided by vulcanization, for example.

An elastic intermediate layer 6, 7 between the nut M and the interior wall 116 of the recess 100 has the advantage that manufacturing tolerances in the nut M and the recess 100 are compensated, but that in spite of this the nut M is securely radially clamped in the recess 100. Moreover, the simple removal from and reinsertion of the nut M into the recess 100 is assured. A further advantage lies in that, in the course of screwing in the screw S, the nut M in the recess 100 can adapt itself to the position of the screw S in that the nut M can be moved perpendicularly with respect to the axial direction of the associated screw S. The possible movement path is a function of the thickness and elasticity of the coating 7, or of the O-ring 6, and is selected to meet the requirement.

Alternatively the elastic coating 7 can also be arranged on the interior wall 116 of the recess 100. In the same way can the O-ring 6 be inserted into a groove in the interior wall 116 of the recess 100.

Figure 10:
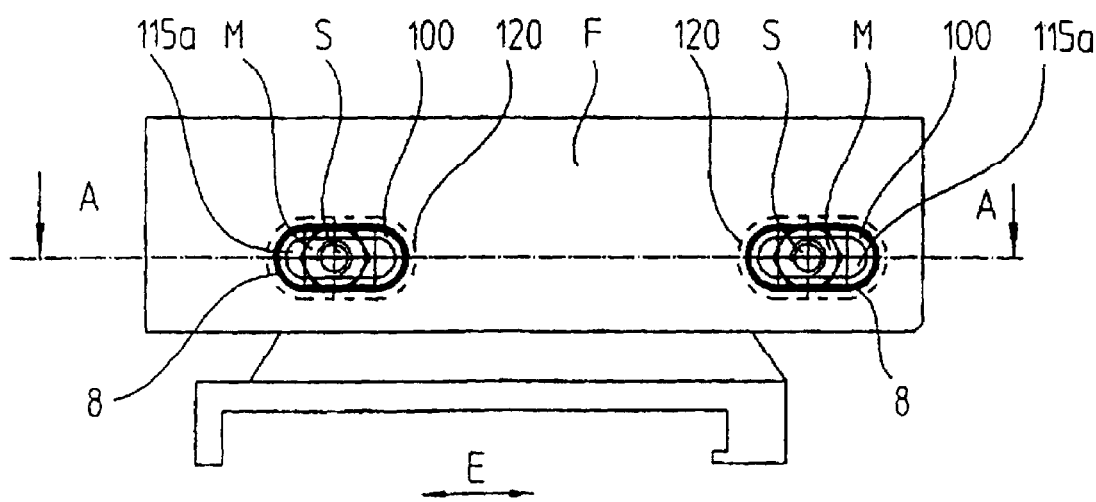
FIG. 10 shows an exemplary embodiment wherein an embodiment of a blocking element is an O-ring inserted into an embodiment of a recess.
Figure 11:
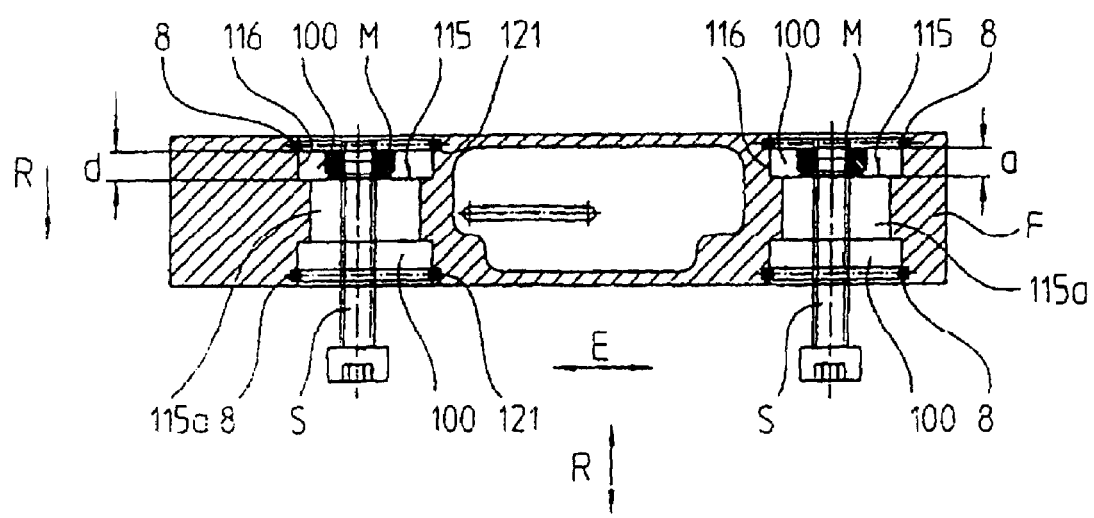
FIG. 11 shows a representation along the line A-A of the exemplary embodiment in FIG. 10.

FIGS. 10 and 11 show a particularly advantageous exemplary embodiment. A blocking element 8 in the form of an element which can be widened at least in the radial direction (direction perpendicular to R) is arranged at a distance a from the bottom 115 of the recess 100. In the example shown, this element is a resiliently yielding O-ring 8 in a groove 121 of the recess 100. The distance a between the bottom 115 of the recess 100 and the O-ring 8 in the axial direction R is greater than, or at least equal to the thickness of the nut M. This has the advantage that in the inserted state the nut M can be shifted in the direction E in the linearly extending recess 100.

Thus the O-ring limits the access opening of the recess 100 in the circumferential direction in such a way that it exerts a resistance on the nut M in the course of pressing in the nut M, which can be overcome. The insertion force of the nut M leads to radial widening of the O-ring 8 and the freeing of the access opening of the recess 100 for the nut M. Once the nut M has been completely pushed into the recess 100, the O-ring relaxes again behind the nut M and releases the circumference of the nut M. Because of the relaxation of the O-ring 8, the access opening closes and constitutes a block for the movement of the nut M in the axial direction R.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A position measuring system for determining the position of a first structural component and a second structural component, said position measuring system comprising:
   a first support for receiving a first position measuring device, which is set up and provided for being fastened to said first structural component;
   a second support for receiving a second position measuring device, which is set up and provided for being fastened to said second structural component;
   a first connector that fastens said first support to said first structural component;
   a second connector that fastens said second support to said second structural component, wherein said second connector comprises:
      a nut, with which a screw can be brought into engagement, wherein said nut is inserted into a recess of said second support;
      a blocking element which, in an inserted state, works together with said nut in order to prevent a movement of said nut out of said recess in an axial direction, which is a direction of insertion of said screw into said nut, sufficiently far so that insertion of said screw into said nut is made possible.

2. The position measuring system in accordance with claim 1, wherein said first position measuring device comprises a scale graduation and said second position measuring device comprises a scanning unit.

3. The position measuring system in accordance with claim 2, wherein said scale graduation is a linear scale graduation.

4. The position measuring system in accordance with claim 3, wherein said first support comprises a housing for said linear scale graduation, and said second support comprises a mounting base, with which said scanning unit scanning said scale graduation is connected.

5. The position measuring system in accordance with claim 1, wherein said first position measuring device comprises a scanning unit and said second position measuring device comprises a scale graduation.

6. The position measuring system in accordance with claim 5, wherein said scale graduation is a linear scale graduation.

7. The position measuring system in accordance with claim 6, wherein said second support comprises a housing for said linear scale graduation, and said first support comprises a mounting base, with which said scanning unit scanning said scale graduation is connected.

8. The position measuring system in accordance with claim 1, wherein said blocking element comprises a clip by which said recess is covered, and said nut is arranged in said recess between a bottom of said recess and a contact face of said clip.

9. The position measuring system in accordance with claim 8, wherein a distance (a) between said bottom of said recess and said contact face of said clip in said axial direction is greater than a thickness (d) of said nut.

10. The position measuring system in accordance with claim 8, wherein said clip is arranged in said recess and is fixed in place.

11. The position measuring system in accordance with claim 10, wherein said clip is fixed in place against a wall of said recess.

12. The position measuring system in accordance with claim 11, wherein said wall is a partially encircling interior wall of said recess.

13. The position measuring system in accordance with claim 12, wherein said clip presses with at least one edge against said interior wall of said recess in such a way, that it is fixed in place in said recess.

14. The position measuring system in accordance with claim 13, wherein said clip can be deformed in at least one partial area in such a way, that it presses with prestress against one of said at least one edge against said interior wall of said recess.

15. The position measuring system in accordance with claim 13, wherein said clip comprises:
an angled-off section extending along said interior wall of said recess; and
a tongue provided on said angled-off section, which acts by an edge on said interior wall of said recess.

16. The position measuring system in accordance with claim 13, wherein said clip comprises a substantially flat base body, which can be elastically deformed in such a way that it rests under prestress with at least one outer edge against said interior wall of said recess.

17. The position measuring system in accordance with claim 10, wherein said clip can be fixed in place with positive contact in said recess.

18. The position measuring system in accordance with claim 17, wherein said clip can be fixed in place in said recess by a connector selected from the group consisting of a snap-in connector and a plug connection.

19. The position measuring system in accordance with claim 18, wherein said connector is a snap-in connector that comprises a snap-in hook, which engages an undercut with a snap-in section, wherein said snap-in hook is provided on said clip, and said snap-in opening is provided at an interior wall of said recess.

20. The position measuring system in accordance with claim 17, further comprising a pin that engages a hole formed in said second support, wherein said pin is provided on said clip and said hole is located in a vicinity of said recess.

21. The position measuring system in accordance with claim 8, wherein said clip defines an elongated hole in a base body, into which said screw can protrude.

22. The position measuring system in accordance with claim 8, wherein said clip is embodied in such a way that it acts as a safeguard against twisting, which counteracts twisting of said nut in said recess.

23. The position measuring system in accordance with claim 22, wherein said clip encloses said nut in a positively-connected manner.

24. The position measuring system in accordance with claim 1, wherein said nut can be clamped in said recess by said blocking element.

25. The position measuring system in accordance with claim 24, wherein said blocking element comprises an elastically yielding element that is arranged between an interior wall of said recess and an outer circumference of said nut so that said nut can be clamped in said recess.

26. The position measuring system in accordance with claim 25, wherein said elastically yielding element comprises an O-ring.

27. The position measuring system in accordance with claim 26, wherein said O-ring is maintained in a groove of said recess.

28. The position measuring system in accordance with claim 26, wherein said O-ring is maintained in a groove of said nut.

29. The position measuring system in accordance with claim 25, wherein said elastically yielding element comprises an elastic coating formed on said nut.

30. The position measuring system in accordance with claim 25, wherein said elastically yielding element comprises an elastic coating formed on a wall of said recess.

31. The position measuring system in accordance with claim 1, wherein said blocking element is designed and arranged in such a way that it is already effective when inserting said nut in said recess, in that said blocking element is already applied to said recess or said nut when inserting said nut in said recess.

32. The position measuring system in accordance with claim 1, wherein said blocking element comprises an elastically yielding element which delimits an access opening of said recess for inserting said nut over a circumference of said nut and, in the course of inserting said nut, exerts a resistance on said nut, which can be overcome, but releases said circumference of said nut once said nut has been inserted into said recess.

33. The position measuring system in accordance with claim 32, wherein said elastically yielding element comprises an O-ring.

34. The position measuring system in accordance with claim 33, wherein said O-ring is maintained in a groove of said recess.

35. The position measuring system in accordance with claim 32, wherein a distance (a) in said axial direction between a bottom of said recess and said blocking element is greater than or equal to a thickness (d) of said nut.

36. The position measuring system in accordance with claim 1, wherein a geometric design of said recess defines a safeguard against twisting which counteracts twisting of said nut in said recess.

37. The position measuring system in accordance with claim 1, wherein said recess is designed to extend in a longitudinal direction in such a way that said nut can be shifted therein with a component perpendicular to said axial direction.

* * * * *